United States Patent [19]

Sims, Jr.

[11] Patent Number: 4,511,936
[45] Date of Patent: Apr. 16, 1985

[54] SWITCH AND OPTICAL SENSOR ASSEMBLY FOR RECORDER

[75] Inventor: Dewey M. Sims, Jr., Wayne, Mich.

[73] Assignee: Northern Telecom Inc., Nashville, Tenn.

[21] Appl. No.: 381,401

[22] Filed: May 24, 1982

[51] Int. Cl.³ ............................................ G11B 15/18
[52] U.S. Cl. ........................................ 360/69; 360/60; 360/74.6; 250/229
[58] Field of Search ................. 360/74.6, 60, 69, 96.5, 360/74.5; 250/229

[56] References Cited

U.S. PATENT DOCUMENTS

| | | | |
|---|---|---|---|
| 3,336,482 | 8/1967 | Mierendorf et al. | 250/229 |
| 3,688,300 | 8/1972 | Whysong et al. | 360/60 |
| 3,861,619 | 1/1975 | Wolff | 360/74.6 |
| 3,976,262 | 8/1976 | Kennedy | 242/192 |
| 3,988,779 | 10/1976 | Leis et al. | 360/96.5 |
| 3,997,916 | 12/1976 | Staar | 360/60 |
| 4,057,839 | 11/1977 | Banks | 360/74.6 |

Primary Examiner—Bernard Konick
Assistant Examiner—Steven R. Garland
Attorney, Agent, or Firm—Price, Heneveld, Huizenga & Cooper

[57] ABSTRACT

A switch assembly is provided for a tape drive adapted to receive a tape cartridge. The assembly comprises a housing, first and second switches fixedly mounted on the housing, and first and second plungers mounted for reciprocal movement on the housing to actuate the first and second switches, respectively. The housing includes three orthogonal reference surfaces, all of which engage the tape drive to locate the assembly in proper relationship to the tape drive. The plungers are responsive to the tape cartridge to actuate the first switch when the tape cartridge is properly mounted on the drive and to actuate the second switch when the tape cartridge is not write-protected. The assembly may include a light source and a light-responsive switch which, together with a reflector in the tape cartridge, cooperate to detect position-indicating tape apertures.

20 Claims, 8 Drawing Figures

U.S. Patent  Apr. 16, 1985  Sheet 1 of 3  4,511,936
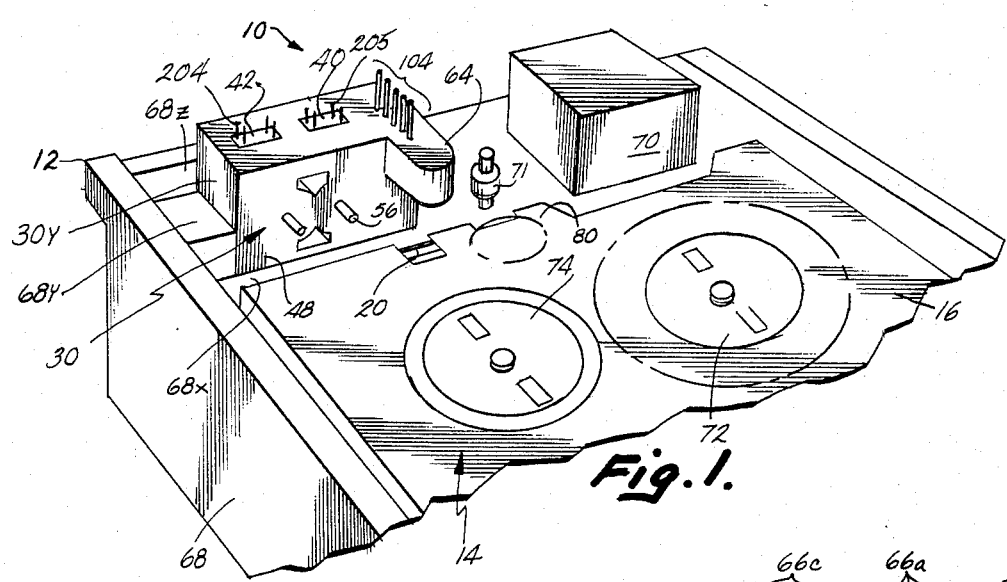
Fig. 1.
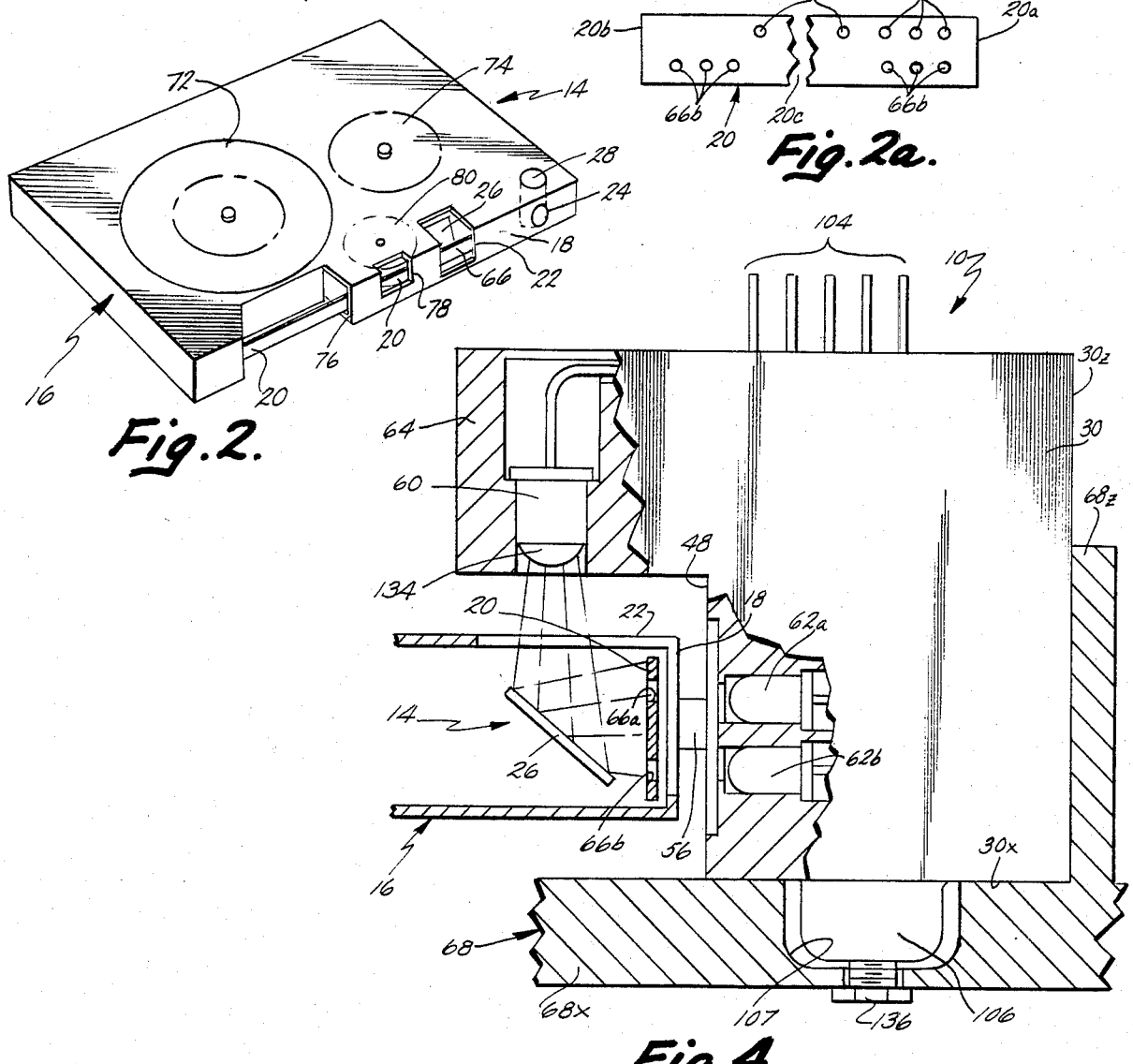
Fig. 2.
Fig. 2a.
Fig. 4.

SWITCH AND OPTICAL SENSOR ASSEMBLY FOR RECORDER

BACKGROUND OF THE INVENTION

The present invention relates to tape recorders, i.e., tape drives, and more particularly to tape cartridge recorders which include means for detecting (1) whether a cartridge is present, (2) whether a cartridge is write-protected, and (3) whether or not there are position-indicating apertures in the tape inside the cartridge.

Tape cartridge recorders, particularly those used as secondary storage in computing systems, often include three sensors for detecting (1) whether a cartridge is properly loaded on the recorder (cartridge-present), (2) whether a loaded cartridge is write-protected (write-protect), and (3) position-indicating apertures in the magnetic tape contained in the cartridge. The cartridge-present sensor is actuated by a cartridge mounted on the recorder only when the cartridge is properly loaded and in ready position for data transfer. The write-protect sensor is actuated by the cartridge loaded on the recorder when a mechanical device on the cartridge is positioned to indicate that the tape may be written onto. When the write-protect sensor is not actuated, write heads of the recorder are disabled to prevent data transfer onto the tape. Finally, the aperture-detecting sensor is usually an optical assembly having a device directing light against the tape, and a light-sensitive device actuated by the directed light when apertures in the tape permit the light to pass therethrough. Usually, an aperture, or a series of apertures, is located proximate either end of the tape to signal an end-of-tape condition. Consequently, the aperture-detecting sensor upon detecting an aperture in the tape signals the computing system that an end-of-tape condition is imminent.

Usually, these three sensors are separately mounted on the recorder, albeit on a common housing, and individually adjustable with respect to one another. Consequently, this portion of the recorder assembly is labor intensive, due to the fact that each one of the three sensors must be individually adjusted to be actuated under the precise conditions desired. Further, the sensors are often interrelated so that adjustment of one sensor throws a previously adjusted sensor out of alignment. In such case, the previously adjusted sensor must be readjusted, further increasing assembly costs.

Further, the cartridge-present and write-protect sensors are generally mechanical microswitches. When considered in view of the precise tolerances required of these sensors, a microswitch has a relatively large tolerance so that even a properly aligned switch might not actuate in response to the desired parameters. Additionally, if not actuated for a period of time, these mechanical switches incur an oxide build-up which interferes with subsequent switch actuation. Although gold-plated and cross-bar switches, which have low-resistance oxides compared to conventional microswitches, are available, these switches are relatively expensive, further boosting the cost of the recorder.

SUMMARY OF THE INVENTION

The present invention solves these and other problems in the prior art by providing a switch and optical sensor assembly wherein the cartridge-present and write-protect sensors are positioned on a common housing in a fixed, non-adjustable relationship. The housing is formed with manufacturing tolerances that complement the alignment tolerances of the cartridge. Consequently, when the housing is properly aligned with reference surfaces on the tape drive, and the cartridge-present and write-protect sensors are properly mounted on the housing, both the cartridge-present and write-protect sensors are automatically positioned in proper alignment to respond to the desired cartridge-present and write-protect parameters.

In a preferred embodiment of the invention, the assembly further includes an optical sensor for detecting apertures in the tape within the cartridge. The optical sensor is also disposed on the housing in fixed, non-adjustable relation to both the cartridge-present and write-protect sensors.

Because the sensors are in fixed, non-adjustable relation on the housing of the present invention, the sensors are all properly aligned on the tape drive when the housing is properly aligned on the drive. The sensor assembly greatly facilitates installation of the sensors upon recorders during manufacture due to the fact that the sensors need not be individually installed or individually adjusted.

In another preferred embodiment of the invention, the cartridge-present and write-protect sensors include first and second optical switches, respectively. Accordingly, the prior problems associated with the large tolerances and oxide build-up of mechanical microswitches are eliminated. Further, the optical switches are relatively inexpensive and virtually fail-safe.

These and other objects, advantages, and features of the invention will be more fully understood and appreciated by reference to the written specification and appended drawings.

BRIEF DESCRIPTION OF THE DRAWINGS

FIG. 1 is a fragmentary, perspective view of a cartridge tape drive with the switch and optical sensor assembly of the present invention installed thereon and with a tape cartridge partially in place thereon;

FIG. 2 is a perspective view of a tape cartridge of the type used on the present recorder;

FIG. 2a is a fragmentary view of the tape within the tape cartridge;

FIG. 4 is a partially sectional, fragmentary, side elevational view of the switch and optical sensor assembly installed on the recorder, with a tape cartridge shown in operative position on the recorder;

DESCRIPTION OF THE PREFERRED EMBODIMENT

Figure 3:
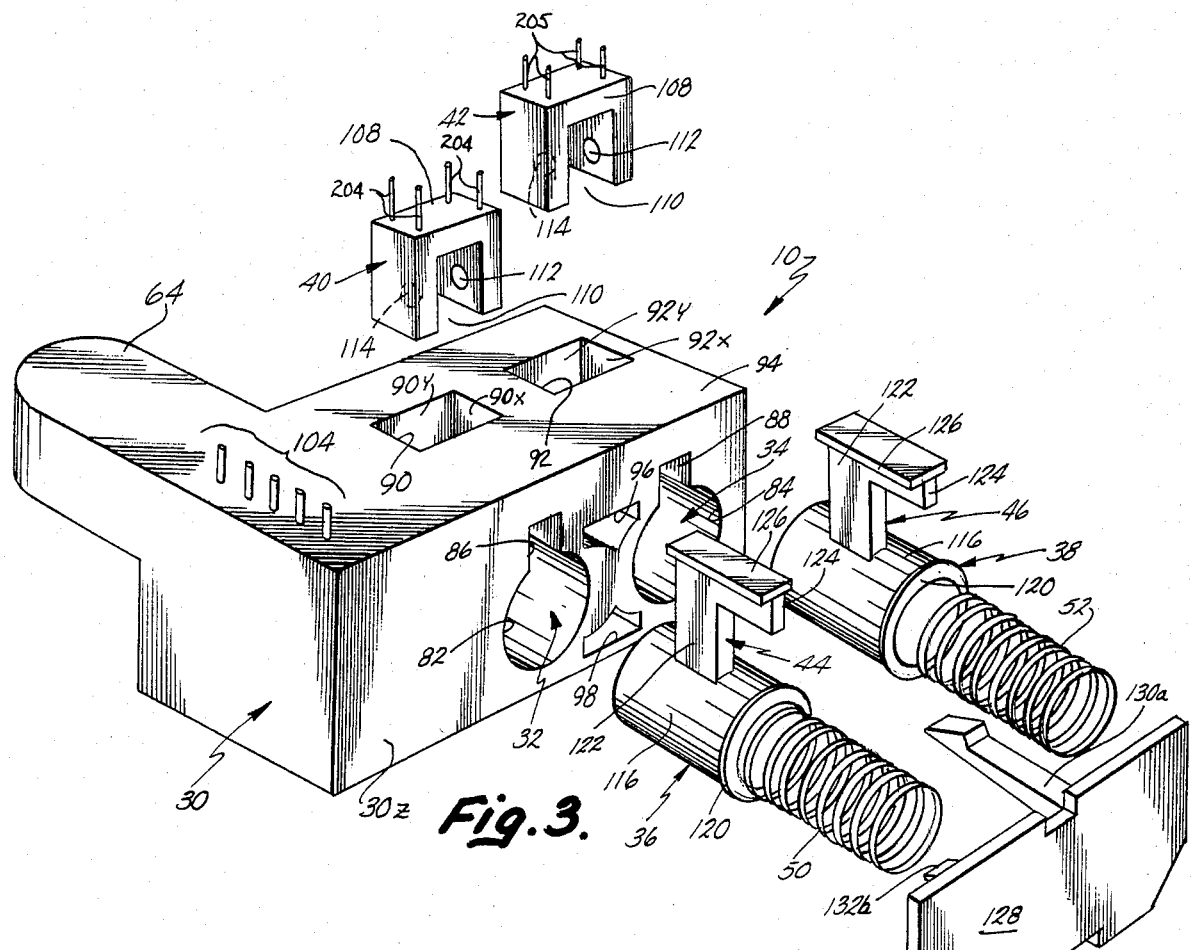
FIG. 3 is an exploded, perspective view of the switch and optical sensor assembly.

A switch and optical sensor assembly constructed in accordance with the present invention is illustrated in the drawings and generally designated 10. As seen in FIG. 1, assembly 10 is mounted on recorder, or drive, 12, which is adapted to receive tape cartridge 14. As seen in FIG. 2, cartridge 14 includes housing 16, having a forward surface 18 which defines transparent window 22 and aperture 24, and tape 20 supported within housing 16 to be movable laterally with respect to forward surface 18. A reflector 26 is mounted on housing 16 at approximately a 45° angle with respect to forward surface 18 to reflect light, as will be described. File-protect door 28 is rotatably mounted in housing 16 and includes a first position, blocking access to the interior of housing 16 through aperture 24, and a second position, permitting such access.

Figure 5:
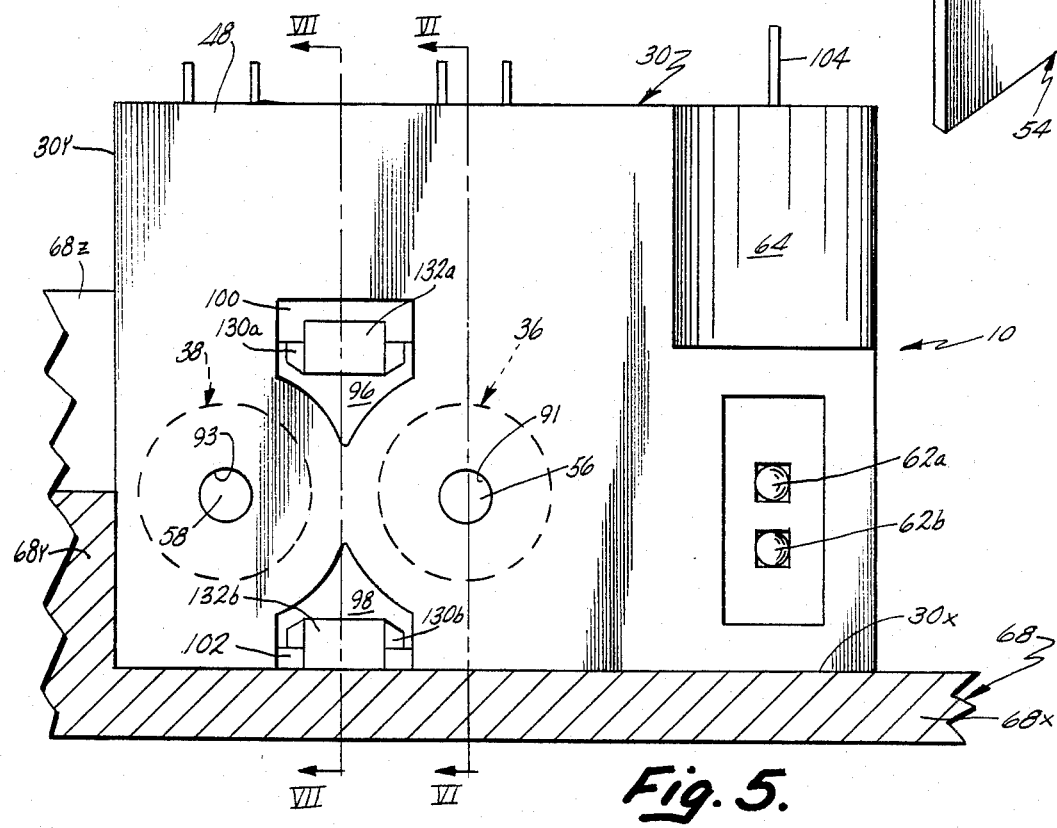
FIG. 5 is a partially sectional, fragmentary, front elevational view of the switch and optical sensor assembly installed on the recorder.
Figure 6:
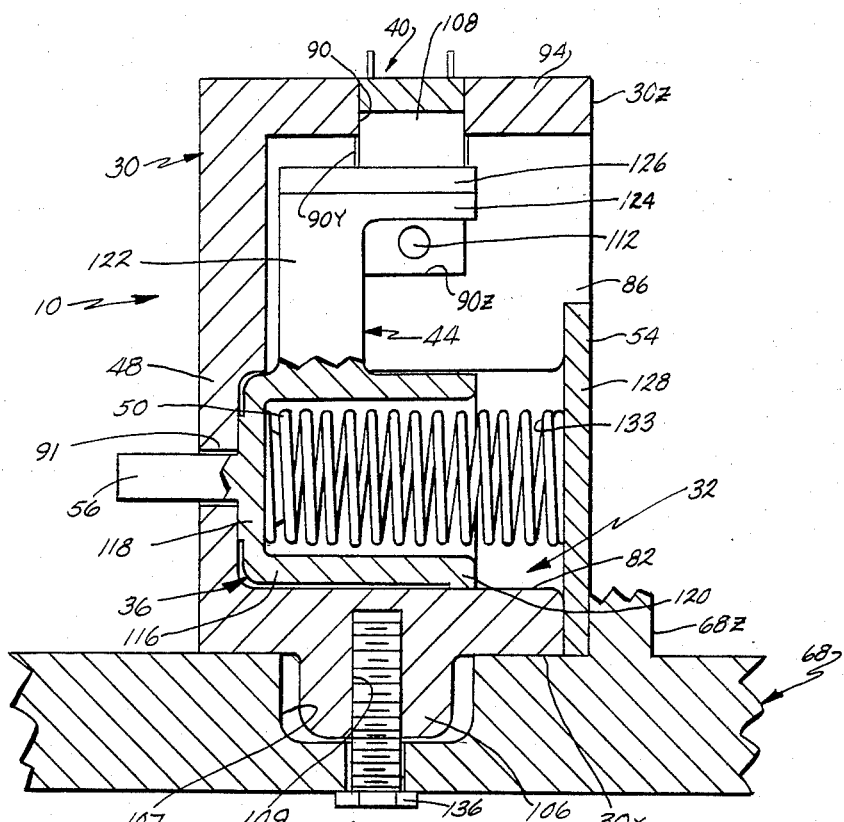
FIG. 6 is a fragmentary, sectional view taken along plane VI—VI in FIG. 5.
Figure 7:
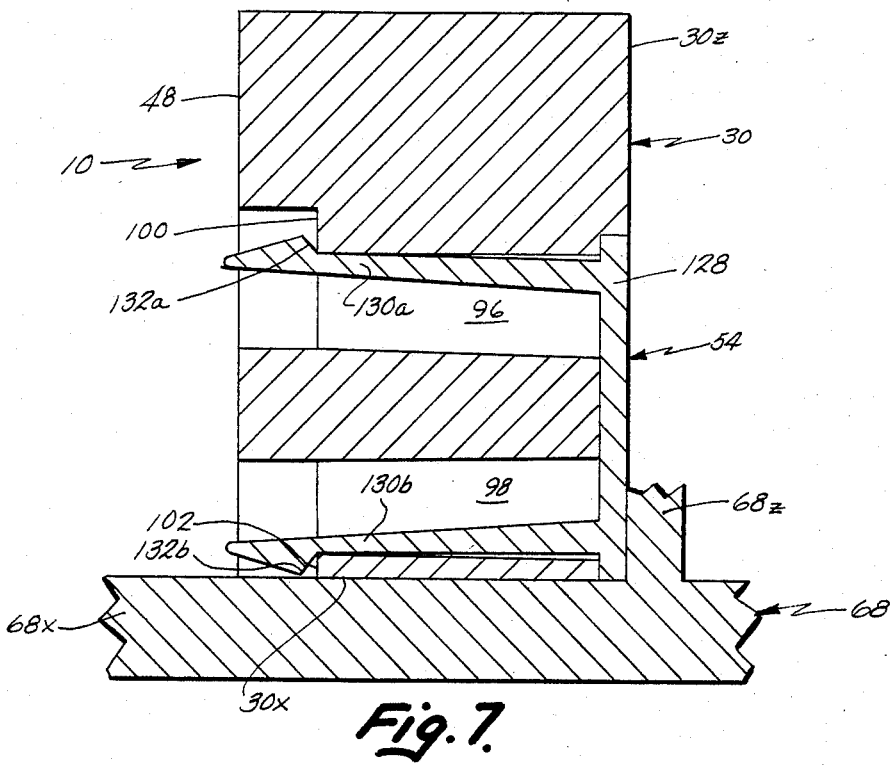
FIG. 7 is a fragmentary, sectional view taken along plane VII—VII in FIG. 5.

Assembly 10 (FIGS. 1, 3, 4, 5, 6, and 7) includes an integral housing 30, defining keyhole chambers 32 and 34 (FIGS. 3 and 6), and plungers 36 and 38 slidably mounted within chambers 32 and 34, respectively. Optical switches 40 and 42 are mounted within housing 30 straddling chambers 32 and 34, respectively, and are actuated by flags 44 and 46 extending from plungers 36 and 38, respectively. Plungers 36 and 38 are biased toward forward wall 48 of housing 30 by springs 50 and 52, respectively, which are compressively positioned between the plungers and spring cover 54, which is in turn secured to housing 30. Plungers 36 and 38 further include integral studs 56 and 58 (FIGS. 1, 5, and 6), respectively, which extend through tape-facing surface 48 of housing 30. Studs 56 and 58 are positioned to align with aperture 24 and front surface 18, respectively. Plunger 36 and optical switch 40 together detect a cartridge-present condition. If a cartridge is not properly seated on drive 12, plunger 36 is biased forwardly by spring 50, as shown in FIG. 6, so that flag 44 does not actuate optical switch 40. However, when a cartridge is properly mounted on drive 12, forward surface 18 forces stud 56 rearwardly and, consequently, plunger 36 rearwardly so that flag 44 actuates optical switch 40. In a similar manner, plunger 38 and optical switch 42 together determine whether cartridge 14 is write-protected after cartridge 14 is properly mounted on recorder 12. If file-protect door 28 is in its first position (cartridge write-protected), permitting stud 58 to extend into housing 16, plunger 38 is biased forwardly by spring 52 so that flag 46 does not actuate optical switch 42. However, if file-protect door 28 is rotated to its second position (cartridge not write-protected), stud 58 cannot protrude through aperture 24 into housing 16. Consequently, plunger 38 is forced rearwardly by file-protect door 28 so that flag 46 actuates optical switch 42.

Assembly 10 further includes light-emitting device 60 and photo-sensitive devices 62a and 62b mounted in housing 30 to cooperate with reflector 26 in cartridge 14 to detect apertures 66 in tape 20 (FIG. 4). Light-emitting device 60 is supported in projection 64 which extends forwardly from assembly 10 over cartridge 14 when the cartridge is properly installed on recorder 12. Further, light-emitting device 60 is arranged to direct light downwardly onto reflector 26, which directs light emitted by device 60 generally in the direction of photo-sensitive devices 62a and 62b. Tape 20 does not define apertures along the majority of its length, so that usually the light emitted by device 60 does not reach devices 62a and 62b. As most clearly seen in FIG. 2a, marker holes, or apertures, 66 are positioned near either end of tape 20. Both upper holes 66a and lower holes 66b are located at the beginning 20a of the tape. Only lower holes 66b are located at the end 20b of the tape. Early warning apertures 66c are positioned on either side of data area 20c. This tape configuration is more completely described in the referenced ANSI standard. When apertures 66a and 66c pass transparent window 22, light is reflected from reflector 26 onto device 62a.

Similarly, apertures 66b allow light to be reflected onto device 62b. When so actuated, devices 62a and 62b signal drive 12 that the end-of-tape condition has been reached.

For purposes of the present invention, the overall nature and operation of the cartridge tape drive, or recorder, 12 (FIG. 1) may be assumed to be well known to those having ordinary skill in the art. Suffice it to say that recorder 12 includes head assembly 70 and housing 68 adapted to support a tape cartridge 14 proximate the head assembly for reading, and writing data off of, and onto, tape 20. Housing 68 includes integrally molded, generally planar walls 68 (FIGS. 1 and 4–7), 68y (FIGS. 1 and 5), and 68z (FIGS. 1 and 4–7), which provide a set of orthogonal reference planes. More particularly, walls 68x, 68y, and 68z are mutually perpendicular. Recorder 12 further includes capstan 71 which rotates when recorder 12 is actuated to transport the tape past head assembly 70.

Tape cartridge 14 (FIG. 2) is also well known to those having ordinary skill in the art. The cartridge includes generally rectangular housing 16 having forward surface 18 and a quantity of tape 20 (for example one-quarter inch wide magnetic recording tape) supported within the housing for movement laterally with respect to forward edge 18. Housing 16 rotatably supports supply spool or reel 72 and take-up spool or reel 74, about which tape 20 is wound for storage and transportation within the cartridge. Forward edge 18 of housing 16 serially defines a head access window 76, a transport window 78, a transparent window 22, and circular aperture 24. When cartridge 14 is properly seated on recorder 12, head assembly 70 engages tape 20 through head window 76 to write data onto and read data from the tape. A drive wheel 80, rotatably supported within housing 16, cooperates with rotating capstan 71 in the manner of a drive roller to engage tape 20 therebetween at transport window 78, to impart tape movement, as more fully described in American National Standard X3.55-1977 published by American National Standards Institute, Inc., of New York, N.Y. A cartridge of the type described is that sold under the trade designation "Data Cartridge" by Minnesota Mining and Manufacturing Company of Minneapolis, Minn.

Now turning specifically to the construction of assembly 10 (FIGS. 3, 4, and 5), it is seen that housing 30 is a generally box-like member fabricated of plastic or the like which includes light-supporting projection 64. The housing includes generally planar bottom surface 30x (FIGS. 4–7), side surface 30y (FIGS. 1 and 5), and rear surface 30z (FIGS. 3, 4, 6 and 7), which form a set of orthogonal reference planes. More particularly, surfaces 30x, 30y, and 30z are mutually perpendicular and abut housing walls 68x, 68y and 68z, respectively, in assembly 10 to maintain housing 30 in fixed relationship to recorder 12. Housing 30 defines keyhole chambers 32 and 34 which include cylindrical portions, or bores, 82 and 84 and slotted portions 86 and 88 communicating with and extending upwardly therefrom, respectively. Bores 82 and 84 are generally parallel to one another, and slotted portions 86 and 88 are also generally parallel to one another and oriented at approximately the same angular orientation with regard to the cylindrical portions. Chambers 32 and 34 both extend into housing 30 through rear wall 30z and terminate at forward wall 48 (FIG. 6). Stud apertures 91 and 93 extend through forward wall 48 into chambers 32 and 34, respectively, and are generally concentric with bores 82 and 84, respectively (FIGS. 5 and 6). Housing 30 further defines generally rectangular switch apertures 90 and 92 (FIGS. 3 and 6) which extend through upper wall 94 to communicate with slotted portions 86 and 88, respectively. Aperture 90 includes surfaces 90x (FIG. 3), 90y (FIGS. 3 and 6), and 90z (FIG. 6), which comprise an orthogonal set of reference surfaces. Likewise, aperture 92 includes orthogonal surfaces 92x (FIG. 3), 92y and 92z (not visible). Additionally, housing 30 defines tent-shaped spring cover arm apertures 96 and 98 (FIGS. 3 and 7), which extend through rear surface 30z and are both generally parallel to chambers 32 and 34. Apertures 96 and 98 terminate in detent surfaces 100 and 102, respectively, (FIG. 7) which extend laterally from apertures 96 and 98 and are recessed from forward wall 48 of housing 30. Electrical contacts 104 (FIGS. 1, 3, 4 and 5) extend upwardly from upper surface 94 of housing 30 to provide a means for electrically connecting assembly 10 to recorder 12. Preferably, assembly 10 is solder connected directly to the program control board (not shown) of recorder 12, eliminating the need for a connector therebetween, which reduces assembly cost and improves reliability. Switches 40 and 42 and light-sensitive devices 62a and 62b are electrically connected to contacts 204 and 205. Mounting stud 106 is generally round in horizontal cross section and extends downwardly from housing 30 into receiving socket 107 in recorder housing 68 (FIG. 6). Mounting stud 106 in turn defines threaded aperture 109.

Optical switches 40 and 42 (FIGS. 3 and 6) are commercially available switches, each of which includes a supporting saddle 108, which defines a flag-receiving void 110 and supports a light-emitting device 112 and a light-sensitive device 114 opposite one another across void 110. Device 112 emits a beam which, when unobstructed, sensitizes and actuates device 114. Each of switches 40 and 42 is deactuated by breaking the beam, or path, between devices 112 and 114. Switch 40 closely interfits with surfaces 90x, 90y and 90z to maintain the switch in fixed relationship to housing 30 (FIG. 6). Likewise, switch 42 closely interfits with surfaces 92x, 92y and 92z for the same purpose.

Plungers 36 and 38 (FIGS. 3 and 6) are also preferably fabricated of plastic and generally identical to one another, and each includes a generally cylindrical body portion 116 from which flags 44 and 46 extend generally laterally. Each of body portions 116 is capped by integral cap 118 from which studs 56 and 58 extend. An annular ring, or lip, 120 extends radially from each body 116 at the rear, terminal edge thereof. The external diameter of lips 120 is only slightly smaller than the internal diameter of bores 82 and 84. Each of flags 44 and 46 includes a switch-actuating arm 122 extending from body 116 and a guide arm 124 which extends generally perpendicularly from arm 122. Guide lip 126 extends around the perimeter of guide arm 124 and is only slightly more narrow than slot portions 86 and 88 are wide.

Coil springs 50 and 52 (FIGS. 3 and 6) are compressively positioned within bodies 116 of plungers 36 and 38, respectively, and extend between cap 118 and spring cover 54.

Spring cover 54 is also preferably fabricated of plastic and includes a generally rectangular retainer plate 128 and a pair of clip arms 130a and 130b extending forwardly therefrom, terminating in detent portions 132a and 132b, respectively. Spring-centering hubs or bosses are formed integrally with and extend forwardly from plate 128 into coil springs 50 and 52, respectively, to prevent the springs from moving laterally with respect to the plate. Plate 128 and arms 130a and 130b are preferably integrally molded from a stiffly resilient plastic material such as glass fiber filled polycarbonate so that spring arms 130a and 130b, when flexed toward one another, are biased away from one another.

Light-supporting projection 64 (FIGS. 1, 3, 4 and 5) extends forwardly from housing 30, and more particularly from forward wall 48 thereof. A light source 60, including a light-emitting device 61, is mounted within projection 64 to direct light downwardly through the transparent window 22 of a properly seated cartridge 14, onto its reflector 26 (FIG. 4). Source 60 includes a diverging lens 134 to increase dispersion of light from the device. Light-sensitive devices, or switches, 62a and 62b are mounted in spaced relation one above the other in forward surface 48 of housing 30, and are selected to be sensitive to light reflected off reflector 26. Devices 62a and 62b are selected so that they are 1) unactuated when tape 20 blocks the passage of light from reflector 26 toward devices 62a and 62b, and 2) actuated when apertures 66 pass in front of reflector 26, permitting light to pass from reflector 26 onto one or both of the light-sensing devices. If both device 62a and 62b are activated simultaneously, a beginning-of-tape condition has been encountered. If only device 62a is activated, an early warning aperture has been detected. And if only device 62b is activated, an end-of-tape condition has been encountered. Both light-emitting device 61 and light-sensitive devices 62a and 62b are well known to those skilled in the art. A suitable light-emitting device is the gallium arsenide infrared emitter sold by Optron, Inc., designated part No. OP133. A suitable light-sensitive device is the silicon phototransistor sold by Optron, Inc. as part No. OP500.

Operation

Assembly 10 is readily and easily mounted on recorder 12 by inserting mounting stud 106 (FIGS. 4 and 6) into slot 107 in recorder housing 68, and securing same in place therein by threading bolt 136 into aperture 109. Because of the abutment of orthogonal surfaces 30x, 30y and 30z on housing 30 with orthogonal walls 68x, 68y and 68z, assembly 10 can be mounted on recorder 12 with only one orientation or alignment. Consequently, switches 40 and 42 are maintained in fixed, indexed relation to recorder 12.

When cartridge 14 is not present, or improperly seated, on recorder 12, plungers 36 and 38 are biased by springs 50 and 52, respectively, into their fully forward positions as shown in FIGS. 1 and 6. When in this position, switch-actuating arms 122 of flags 44 and 46 are forward of light-emitting devices 112 so that neither of switches 40 and 42 is actuated. Consequently, switch 40 indicates that cartridge 14 is not present or improperly seated.

When cartridge 14 is properly seated, or in its operating position, on recorder 12 (FIG. 4), forward edge 18 of cartridge housing 16 forces stud 56 and, consequently, plunger 36 rearwardly within aperture 32 (see also FIG. 6), so that switch-actuating arm 122 of flag 44 is forced into the beam of light emitted by device 112, to actuate switch 40 and emit an appropriate signal at electrical contacts 204. When cartridge 14 is properly seated on recorder 12, stud 58 may or may not extend into cartridge housing 16, depending upon the orientation of file-protect door 28. If door 28 is positioned so that stud 58 cannot extend into housing 16 through aperture 24, cartridge 14 is not write-protected. Consequently, as cartridge 14 is mounted on recorder 12, door 28 forces stud 58 and plunger 38 rearwardly, forcing switch-actuating arm 122 of flag 46 to actuate switch 42 and emit an appropriate signal at contacts 205. However, if door 28 is positioned so that stud 58 can project into housing 16 through aperture 24, cartridge 14 is write-protected. Consequently, switch 42 will not be actuated as cartridge 14 is mounted on recorder 12. Plunger 36 slidingly engages housing 30 at only three locations—first, at lip 120 within bore 82; second, at lip 126 within slot 86; and third, at stud 56 within aperture 91. Likewise, plunger 38 slidingly engages housing 30 between (1) lip 120 and bore 84, (2) lip 126 and slot 88, and (3) stud 58 and aperture 93. Accordingly, plungers 36 and 38 cannot become jammed in chambers 32 and 34 which must be tapered along their lengths so that housing 30 can be removed from the mold after molding. Guide arms 124 support switch-actuating arms 122 within chambers 32 and 34.

When switch 40 indicates that cartridge 14 is properly seated, device 60 is actuated to direct light downwardly through diverging lens 134 and onto reflector 26. The reflector directs the light against tape 20, which along the majority of its length prevents the light from reaching light-sensitive devices 62a and 62b. However, when an aperture 66 in tape 20 passes in front of reflector 26, the light passes through the aperture and actuates one of light-sensitive devices 62a and 62b, causing an appropriate electrical signal to be emitted at contacts 104. Apertures 66a and 66c actuate device 62a, while apertures 66b actuate device 62b.

Because the cartridge-present, write-protect, and end-of-tape sensors are all mounted in fixed, nonadjustable relation within a common housing, all three of the sensors are automatically aligned to respond to the proper parameters when the housing is mounted on the recorder. The individual sensors need not be aligned after being mounted on the recorder. This automatic alignment greatly facilitates assembly of the recorder and, consequently, reduces both manufacturing costs and subsequent maintenance requirements. Further, the use of optical switches in the cartridge-present and write-protect sensors eliminates the problems associated with previously used mechanical microswitches (i.e., oxide build-up and large tolerances).

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An integrated, self-locating switch assembly for a tape recorder of the type having a housing adapted to receive a tape cartridge in an operating position, said tape cartridge including means for indicating whether said tape cartridge is write-protected, said switch assembly comprising:

a switch housing including three orthogonal reference surfaces, all of said reference surfaces comprising accurately-located positioning means for engaging corresponding reference surfaces on said tape recorder housing to locate said switch housing in predetermined indexed relationship to said tape recorder housing;

first and second switches mounted on, and in fixed relationship to, said switch housing, whereby said first and second switches are also maintained in fixed relationship with respect to said tape recorder housing;

a first plunger mounted for guided reciprocal movement within said switch housing and precisely-located so as to be responsive to the position of said tape cartridge by actuating said first switch when said tape cartridge is in said operating position; and a second plunger mounted for guided reciprocal movement within said switch housing and precisely-located so as to be responsive to said cartridge write-protection indicating means by actuating said second switch when said indicating means indicates that said tape cartridge is not write-protected.

2. A switch assembly as defined in claim 1 further comprising means for urging said first and second plungers toward said tape cartridge when said tape cartridge is in said operating position.

3. A switch assembly as defined in claim 2 wherein said first and second switches comprise optical switches.

4. A switch assembly as defined in claim 1 wherein said first and second switches comprise optical switches.

5. A switch assembly as defined in claim 1 wherein said tape cartridge includes a tape defining a position-indicating aperture, and means for reflecting light against said tape, and wherein said assembly further comprises:

a light source mounted in said housing to direct light onto said light-reflecting means and against said tape; and a light-responsive switch mounted in said housing and responsive to, and actuated by, the passage of said light through said aperture in said tape.

6. A switch assembly for a tape recorder having a housing adapted to receive a tape cartridge in an operating position, said tape cartridge including means for indicating whether said tape cartridge is write-protected, said switch assembly comprising:

a switch housing having a cartridge-facing wall and defining first and second chambers, said switch housing including a plurality of reference surfaces, all of said reference surfaces comprising accurately-located positioning means for engaging corresponding reference surfaces on said tape recorder housing, said switch housing being provided with manufacturing tolerances that complement the alignment tolerances of said tape cartridge;

a first switch mounted on and in fixed relationship to said switch housing;

a second switch mounted on and in fixed relationship to said switch housing;

first actuating means mounted for guided reciprocal movement within said first chamber and precisely located so as to be responsive to the position of said tape cartridge for actuating said first switch when said tape cartridge is in said operating position; and second actuating means mounted for guided reciprocal movement within said second chamber and precisely located so as to be responsive to said indicating means, for actuating said second switch when said indicating means indicates that said tape cartridge is not write-protected.

7. A switch assembly as defined in claim 6 wherein said first actuating means comprises a first plunger comprising:
a first plunger body;
first means for urging said first plunger in one direction;
a first stud extending from said first plunger body and located to be engaged by said cartridge as said cartridge is moved into its said operating position, to thereby move said first plunger in a second direction generally opposite said one direction; and
a first flag extending from said first plunger body to actuate said first switch when said cartridge is in said operating position; and wherein said second actuating means comprises a second plunger comprising:
a second plunger body;
second means for urging said second plunger in said one direction;
a second stud extending from said second plunger body and engaged by said indicating means when said means indicates that said cartridge is not write-protected as said cartridge is moved into its said operating position, to thereby move said second plunger in said second direction; and
a second flag extending from said second plunger body to actuate said second switch when said cartridge is in said operating position and said indicating means indicates that said cartridge is not write-protected.

8. A switch assembly as defined in claim 7 wherein said first and second switches comprise first and second optical switches, respectively.

9. A switch assembly as defined in claim 8 wherein said first and second chambers comprise first and second bores, respectively, and first and second slots communicating with said first and second bores, respectively, and wherein said first flag comprises a first guide arm slidingly positioned within said first slot to support said first flag, and wherein said second flag comprises a second guide arm slidingly positioned within said second slot to support said second flag.

10. A switch assembly as defined in claim 7, 8 or 9 wherein said one direction is toward said tape cartridge when said tape cartridge is in said operating position.

11. A switch assembly as defined in claim 7 wherein said first and second chambers comprise first and second bores, respectively, and first and second slots communicating with said first and second bores, respectively, and wherein said first flag comprises a first guide arm slidingly positioned within said first slot to support said first flag, and wherein said second flag comprises a second guide arm slidingly positioned within said second slot to support said second flag.

12. A switch assembly as defined in claim 6 wherein said first and second switches comprise first and second optical switches, respectively.

13. A combined switch assembly and optical sensor device for a tape recorder of the type having a housing adapted to receive a tape cartridge in an operating position, said tape cartridge including a tape defining a position-indicating aperture, said tape cartridge further including means for indicating whether said tape cartridge is write-protected, at least one of said tape cartridge and said tape recorder housing including means for reflecting light against said tape, said device comprising:
a switch housing having a cartridge-facing wall and defining first and second chambers and said switch housing including a plurality of reference surfaces, all of said reference surfaces comprising accurately-located positioning means for engaging corresponding reference surfaces on said tape recorder housing;
a first switch mounted on and in fixed relationship to said switch housing;
a second switch mounted on and in fixed relationship to said switch housing;
first actuating means mounted for guided reciprocal movement within said first chamber and precisely located so as to be responsive to the position of said tape cartridge for actuating said first switch when said tape cartridge is in said operating position;
second actuating means mounted for guided reciprocal movement within said second chamber and precisely located so as to be responsive to said indicating means for actuating said second switch when said indicating means indicates that said tape cartridge is not write-protected;
light source means mounted in a first portion of said switch housing for directing light onto said light reflecting means and against said tape; and
a third light-responsive switch mounted in said switch housing and responsive to and actuated by the passage of said light through said aperture in said tape.

14. A combined switch and sensor device as defined in claim 13 wherein said first actuating means comprises a first plunger comprising:
a first plunger body;
first means for urging said first plunger in one direction;
a first stud extending from said first plunger body and located to be engaged by said cartridge as said cartridge is moved into said operating position to move said first plunger in a second direction generally opposite said one direction; and
a first flag extending from said first plunger body to actuate said first switch when said cartridge is in said operating position; and wherein said second actuating means comprises a second plunger comprising:
a second plunger body;
second means for urging said second plunger in said one direction;
a second stud extending from said second plunger body and engaged by said indicating means when said means indicates that said cartridge is not write-protected as said cartridge is moved into said operating position to move said second plunger in said second direction; and
a second flag extending from said second plunger body to actuate said second switch when said cartridge is in said operating position and said indicating means indicates that said cartridge is not write-protected.

15. A device as defined in claim 14 wherein said first and second switches comprise first and second optical switches, respectively.

16. A device as defined in claim 15 wherein said first and second chambers comprise first and second bores, respectively, and first and second slots communicating with said first and second bores, respectively, and wherein said first flag comprises a first guide arm slidingly positioned within said first slot to support said first flag, and wherein said second flag comprises a second guide arm slidingly positioned within said second slot to support said second flag.

17. A device as defined in claim 14, 15 or 16 wherein said one direction is toward said tape cartridge when said tape cartridge is in said operating position.

18. A device as defined in claim 14 wherein said first and second chambers comprise first and second bores, respectively, and first and second slots communicating with said first and second bores, respectively, and wherein said first flag comprises a first guide arm slidingly positioned within said first slot to support said first flag, and wherein said second flag comprises a second guide arm slidingly positioned within said second slot to support said second flag.

19. A device as defined in claim 13 wherein said first and second switches comprise first and second optical switches, respectively.

20. A device as defined in claim 13 wherein said first portion of said switch housing comprises a projection extending from said assembly beyond said tape when said cartridge is in said operating position and wherein said light source means is positioned beyond said tape.

* * * * *